United States Patent Office 3,749,663
Patented July 31, 1973

3,749,663
HYDROGENATIVE HYDROCARBON
CONVERSION
Grant A. Mickelson, Yorba Linda, Calif., assignor to Union Oil Company of California, Los Angeles, Calif.
No Drawing. Continuation-in-part of application Ser. No. 837,340, June 27, 1969, which is a continuation-in-part of application Ser. No. 761,322, Sept. 20, 1968, both now abandoned. This application Apr. 1, 1971, Ser. No. 130,477
Int. Cl. B01j 11/82; C10g 23/02
U.S. Cl. 208—110    13 Claims

ABSTRACT OF THE DISCLOSURE

A superior hydrogenative hydrocarbon conversion process includes reacting hydrogen with a hydrocarbon feed under conditions sufficient to promote said reaction in the presence of a catalytic combination of at least one molybdenum compound and at least one Group VIII metal or metal compound prepared by impregnating a foraminous refractory oxide support with a highly stable solution of the metal compounds and an acid of phosphorus wherein the impregnating solution has a $P/MoO_3$ weight ratio of about 0.1 to about 0.25 and an initial pH of about 1 to about 2. Even greater advantage relative to previously available hydrogenative hydrocarbon conversion systems is realized when operating on feedstocks containing substantial amounts of organonitrogen and/or aromatic compounds.

RELATED APPLICATIONS

This application is a continuation-in-part of my copending application Ser. No. 837,340, filed June 27, 1969, itself a continuation-in-part of my application Ser. No. 761,322, filed Sept. 20, 1968, both of which are now abandoned.

BACKGROUND

The considerable volume of literature published on the area of hydrogenative hydrocarbon conversion over the past several years makes is readily apparent, even upon only cursory investigation, that considerable effort has been devoted to understanding, defining and improving the numerous aspects and characteristics involved in the variety of processes and reaction mechanisms observed in the catalytically promoted reaction of hydrogen with hydrocarbons. Obviously the investigation of catalyst characteristics alone is not sufficient. Quite the contrary, relevant catalyst characteristics such as physical and compositional properties have significance in a commercial context or in most technological contexts with relation to the response that the catalyst exhibits in a given process environment. A brief investigation of the literature thus far published on this subject illustrates that the number of process parameters, which should realistically include catalyst's compositional and physical characteristics, is almost endless. In addition, the significance of some of these parameters changes in response to changes in other variables. For example, the most highly active gasoline hydrocracking catalysts are not the most highly active midbarrel hydrocracking catalysts. Conversely catalysts which exhibit excellent activity in the absence of nitrogen, sulfur, and/or aromatic compounds often exhibit markedly inferior activity, as compared to other compositions, for hydrocracking feedstocks containing substantial amounts of these deleterious materials. In other words, the activity and selectivity of a given catalyst must be determined not only in relation to the particular conversions desired, i.e., gasoline hydrocracking, midbarrel hydrocracking, denitrogenation, desulfurization, olefin hydrogenation, aromatics hydrogenation and the like, but must be evaluated in view of the system in which the catalyst is expected to perform these objectives.

Obviously, all of the problems involved in this area of technology have not yet been solved nor are the several process parameters which complement or mitigate against the desired objectives completely understood. Consequently, the continuing development of hydrogenative hydrocarbon conversion systems is largely a matter of educated guess, empirical evaluation, and a comprehensive understanding of empirical results. The necessity for this approach to the solution of problems such as improving the activity of a given hydrocarbon conversion system, the selectivity of such systems or their tolerance to what might otherwise be process impurities, derives from the lack of an exact understanding of the nature of those factors which limit activity, selectivity and the like or procedures and compositions which can be employed to correct those problems once identified without detracting from other desired qualities of the original system.

One area of development in which the aforegoing observations are particularly pertinent is that of the present invention. These systems involve the hydrogenative conversion of hydrocarbons, i.e., the reaction of hydrocarbons with either elemental hydrogen or hydrogen supplied by a hydrogen donor, in the presence of a catalyst comprising molybdenum, at least one Group VIII metal compound and phosphorus supported on a refractory inorganic oxide. Compositions containing these and other elements have been the subject of previous investigation. For example, hydrotreating catalysts comprising a Group VIII metal, particularly cobalt or nickel, a Group VI metal, particularly molybdenum or tungsten, or their oxides or sulfides, and phosphorus on an alumina or silica-stabilized alumina base have been disclosed in U.S. Pats. 3,232,887 and 3,287,280. Those catalysts are discussed as being suitable for denitrogenation or desulfurization of petroleum feedstocks as well as for other hydrogenation reactions. U.S. Pat. 3,287,280, in particular, describes methods and impregnating solutions for preparing such catalysts consisting of molybdenum and nickel salts stabilized with phosphoric acid in an aqueous medium. The author discloses the desirability of maintaining the amount and ratio of the constituents of the impregnating solution within relatively narrow ranges. It is this latter observation that is of particular interest in view of the discoveries I have made in an effort to further understand the functions played by each element of these compositions, the interaction of those functions, and the manner in which those functions and interactions are dependent upon the characteristics of a given hydrogenative hydrocarbon conversion system. Although the results of these investigations provide some insight into several aspects of the performance of certain catalyst compositions in hydrogenative conversion systems, they are not sufficiently comprehensive to afford a general understanding of a significant number of influencing factors.

Nevertheless, I have been able to establish that the ratio of phosphorus-to-Group VI metal employed in such solutions is critical, and that the response of the resulting catalysts in hydrogenative conversion systems is substantially enhanced by the use of higher phosphorus-to-molybdenum metal ratios than are employed in the conventional catalyst preparations. In addition, it has been found that proper regulation of the pH of the solution is essential in order to obtain maximum catalytic activity in these systems.

For the catalysis of hydrogenative hydrocarbon conversions such as denitrogenation or desulfurization, the catalytic metals are generally employed in the form of oxides in association with a carrier material. Conventionally, the catalytic metals are applied to the carrier by impregnation with a solution of a compound of the metal, followed by calcination to convert the catalytic metal compounds to oxides. The use of an acid, such as phosphoric acid, is disclosed in the above-mentioned U.S. patents. The disclosed function of the acid is the stabilization of the impregnating solution containing both the Group VI and the Group VIII metal compounds.

However, I have found that stabilization of the impregnating solution per se affords a solution for only one of the major problems associated with the impregnation of catalysts with Group VIII and Group VI metal components. It is generally recognized that the formation of an evenly distributed layer of the active components such as the metals, oxides, or sulfides throughout the entire surface area of the catalyst support enables the most efficient utilization of the entire catalyst surface area, i.e., contact surface, and thereby provides the most active catalyst in most applications. The impregnation of such catalysts supports with the active components herein discussed by the use of "unstabilized" solutions is subject to several distinct disadvantages. For example, precipitation of the active components from solution even prior to contact with the catalyst support occurs to such a significant extent that a considerable amount of the active components are lost as waste material. The catalyst thus formed do not comprise an evenly distributed active component layer. In addition, the active components are deposited on the support surface in the form of crystalline aggregates forming a heterogeneous non-uniform catalyst surface of inferior activity. Precipitation of the active components from the impregnating solution becomes particularly acute at higher concentrations. For this and other reasons hereinafter discussed, it has previously been necessary to employ impregnating solutions of such reduced concentration that multiple impregnations were necessary to deposit the desired amount of active material on the support surface. The multi-step impregnation necessitated by solution instability generally involves the repeated cyclic contact of a support such as silica or alumina with an impregnating solution of relatively low concentration. Intermittent partial drying between impregnation cycles is often necessary to render the deposited materials in the form less susceptible to extraction on subsequent contact with additional impregnating medium. In that this procedure obviously necessitates a rather involved cyclic batch operation it is much less attractive than a simpler single step or continuous impregnation-calcination procedure. However, the use of that simplified procedure is not advisable due to the instability of the impregnating solutions. The catalysts thus produced are of inferior activity. This result is believed to be attributable to the distribution of active components on the surface of the support medium in a non-uniform manner as relatively large crystalline aggregates.

The same disadvantages are associated with the use of the so called "stabilized" impregnating solutions heretofore employed. The stability of those solutions is not sufficient to enable the use of impregnating media of sufficient concentration to deposit the desired amount of active components on a catalyst support in a single step. An even distribution of the desired component concentration cannot be achieved in a single step, e.g., single dip or spray procedure, due to the fact that impregnating solutions of sufficiently high concentration cannot be maintained in a stable form.

I have also observed that even the catalysts produced by multi-step impregnation with the dilute "stabilized" solutions of the prior art are markedly inferior to those obtainable by the procedures herein described. The "stabilized" solutions of the prior art, such as those discussed in U.S. Pats. 3,232,887 and 3,287,280 are more stable in the classical sense than are solutions containing no stabilizing component. Precipitation from these "stabilized" solutions is less likely in the absence of a support surface, provided the concentration of active components in the impregnating solution is relatively low. However, the active components deposit from these solutions on the support surface as crystallites. This form of deposition is apparently due to the promotion of crystallization of the active components by the support surface. Whatever the cause of crystallite formation, it is understandable that once crystallites form they tend to promote continued crystallization. The result is isolated crystal growth and crystalline aggregate formation in the pores and on the surface. The obvious consequent of this sequence of events is the formation of an unevenly distributed layer of active components on the surface of the support matrix. Such heterogeneity of the catalyst surface is accountable for the lower activity observed.

The problems observed in the impregnation step are not the only enigmas involved in the formulation of a highly active catalyst. The formation of a homogeneous catalyst surface alone does not solve all the problems involved in the preparation of these catalysts. On the contrary, I have observed that the manner in which the catalyst is treated subsequent to impregnation has a dramatic influence on the activity of the finished product. It has previously been considered most expeditious to expose the impregnated support to a preheated furnace in which volatile materials, e.g., water, are rapidly expelled. However, I have discovered that drying of the impregnated support should be conducted at a rate much less than the maximum in order to obtain the most active product. Although the reasons for this result are not known with certainty, it is presumed that either rapid crystallization or steaming of that catalyst are at least partially accountable. It may be that accelerated drying and the corresponding rapid increase in the solution concentration on the surface promote the formation of crystallites and crystalline aggregates.

As discussed in my above-noted copending applications, I have discovered that the unique properties of the catalysts herein disclosed are accountable for the markedly superior response of these compositions in hydrogenative hydrocarbon conversion systems. Several of the more prominent characteristics of these systems includes superior aromatic and olefin hydrogenation activity, superior denitrogenation activity, greater conversion activity and tolerance to both nitrogen and sulfur compounds, higher hydrocracking activity and greater selectivity to midbarrel fuels and lower dry gas production under hydrocracking conditions.

It is therefore one object of this invention to provide a catalyst and hydrogenative hydrocarbon conversion system of increased activity. It is another object of this invention to provide an improved method for the hydrogenative conversion of hydrocarbons. Yet another object of this invention is the provision of an improved system for converting hydrocarbons in the presence of organonitrogen compounds. Another object of this invention is the provision of an improved hydrocracking process. Still another object of this invention is the provision of an improved process for hydrocracking hydrocarbon feeds containing substantial amounts of organonitrogen compounds. Yet another object of this invention is the provision of an improved process for the hydrogenative conversion of hydrocarbons in the presence of organonitrogen compounds.

DETAILED DESCRIPTION

According to the present invention, it has been found that the use of amounts of phosphoric acid, particularly relative to that of Group VI metal, greater than those taught by the prior art is not only effective in stabilizing the impregnating solution but also substantially enhances the catalytic activity of the finished catalyst. The reason for the enhanced activity of the catalysts of the invention is not known with certainty but is believed to relate to the fact that during the preparation of the catalysts of the invention an amorphous colloidal film of the impregnating materials is deposited on the surface of the support, whereas, in the prior art methods the impregnating materials are deposited in crystalline form. This is believed to result in more uniform distribution of the molybdenum and nickel ions on the surface of the carrier throughout its pore structure when the process of the invention is employed. It can, in fact, be shown that solutions prepared according to the process of the invention do not crystallize or precipitate upon standing for months at room temperature. Moreover, no crystallized or precipitated material is formed upon drying the solutions in an evaporating dish or in a thin film on glass, metal or ceramic surfaces; instead, a transparent colloidal film is formed. Solutions outside the limits of concentration and pH of the invention crystallize or precipitate before or during drying and yield opaque films on surfaces.

As previously mentioned, the conditions necessary to produce an amorphous as opposed to crystalline deposit, at the relatively high concentrations necessary to produce a catalyst of the desired composition in a single step, are quite critical. It is presently felt that the most critical of these process conditions are the pH of the solution and the $P/MoO_3$ weight ratio. The pH necessary to achieve this result when the $MoO_3$ content exceeds about 17 weight-percent must be within the range of 1 to about 2 for the solution initially contacted with the substrates. I have observed that pH values slightly above 2, i.e., up to about 2.5, can be employed at somewhat lower $MoO_3$ levels, e.g., during the latter stages of impregnation when the concentration of active components in the impregnating solution are substatnially diminished due to the deposition of those components on the catalyst support. However, the pH should be maintained as close as possible to about 1.5, i.e., about 1.2 to about 1.8. Deviations from that midpoint in either direction render the impregnating solution less stable particularly at $MoO_3$ levels of 17 percent and above. The greater the deviation, the greater the prospect of crystalline deposit formation and crystalline aggregation on the support surface.

In accordance with yet another embodiment of this invention, I have discovered a superior hydrogenative hydrocarbon conversion process in which a hydrocarbon feed is contacted with the described catalyst under a superatmospheric hydrogen partial pressure at conditions sufficient to promote the reaction of hydrogen with the hydrocarbon feed to an extent corresponding to a net consumption of added hydrogen during the reaction period.

In accordance with another embodiment of this invention there is provided an improved hydrogenative hydrocarbon conversion process wherein hydrocarbon feed is contacted with the described catalyst under a superatmospheric hydrogen partial pressure at conditions sufficient to promote the reaction of hydrogen with the hydrocarbon in the presence of the described catalyst and substantially increase the hydrogen-to-carbon ratio of the hydrocarbon feed by an amount corresponding to a net hydrogen consumption of at least about 10 standard cubic feet of hydrogen per barrel of hydrocarbon feed.

In accordance with yet another embodiment of this invention there is provided an improved hydrogenative conversion process wherein a hydrocarbon feed boiling primarily above about 400° F. is contacted with the described catalyst under superatmospheric hydrogen partial pressure under conditions sufficient to produce at least about 110 moles of hydrocarbon product for every 100 moles of hydrocarbon feed contacted. In yet another embodiment a hydrocarbon feed boiling primarily above about 400° F. is contacted with the described catalyst under a superatmospheric hydrogen partial pressure and conditions sufficient to convert at least 20% of the hydrocarbon feed to products boiling below the initial boiling point of the feed. In another embodiment the hydrocarbon feed is contacted with the described catalyst in the presence of at least about 2 parts per million nitrogen present as organonitrogen compounds under conditions sufficient to produce at least 110 moles of product for each 100 moles of feed and/or convert at least 20 volume percent of the feed to products boiling below the initial boiling point of the feed.

The required amount of phophorus is most conveniently expressed as the ratio of the weight of elemental phosphorus to the weight of the Group VI metal oxide. For example, in the specific examples below, the amount of phosphorus is expressed in terms of the phosphorus-to-molybdenum oxide weight ratio, i.e., $P/MoO_3$. It has now been found that this ratio should be at least about 0.1 in order to achieve the desired improvement in the catalytic activity. On the other hand, the use of too high a concentration of phosphorus generally results in diminished catalytic activity. Consequently, the $P/MoO_3$ ratio in the product should be within the range of 0.1 to about 0.25, preferably from 0.12 to about 0.23.

Catalysts having these compositions are conveniently prepared by multi-step pore saturation techniques, e.g., circulation dip, with solutions having $P/MoO_3$ ratios corresponding to those desired in the calcined product. The solutions generally contain from 10 to 30 weight-percent $MoO_3$, 1 to 10 weight-percent of the selected Group VIII metal oxide and 1 to about 6 weight-percent phosphorus on an equivalent basis. However, when the simpler, more efficient single step pore saturation method is employed the solution should contain the equivalent of about 17 to about 30 weight-percent, preferably about 17 to about 24 weight-percent $MoO_3$, 1 to about 8 weight-percent of the Group VIII metal oxide and 2 to about 6 weight-percent phosphorus.

When impregnation is accomplished by prolonged immersion of the foraminous base with excess solution, somewhat lower molybdenum concentrations can be employed. For example, the equivalent oxide mole ratios can be within the range of 10 to 17 weight percent $MoO_3$, 2 to 10 weight-percent of the Group VIII metal oxide and 1 to 4 weight-percent equivalent elemental phosphorus. In these systems the $P/MoO_3$ ratio is preferably somewhat lower than in the pore saturation techniques since phosphorus is deposited at a faster rate than is the molybdenum or Group VIII component. Higher pH, e.g., up to about 2.5, can also be tolerated in the more dilute solutions. However, it is still preferable to assure that the initial pH of even these dilute solutions be within the range of 1 to about 2.

Group VIII metals, suitable for use in the invention are iron, cobalt and nickel, ruthenium, rhodium, palladium, osmium, iridium and platinum. The most attractive Group VIII and Group VI metals in these systems are cobalt, nickel, molybdenum and tungsten. However, these methods exhibit the most significant superiority when employed to prepare catalysts of molybdenum and a Group VIII metal, particularly nickel or cobalt, due to the relative instability of molybdenum containing solutions.

Optimum proportions of the molybdenum and Group VIII metals in the finished catalyst will vary over a considerable range, again depending on the particular metals, the reaction in which the catalyst is employed, the carrier, etc. Optimum proportions are best determined experimentally and can readily be ascertainable by one of ordinary skill in the art. Generally the Group VIII metal, based on the oxide, will comprise about 1 to 10, preferably 1 to 6 weight-percent of the catalyst, with the $MoO_3$ comprising about 5 to 40, preferably 10 to 20 weight-percent of the catalyst.

The required phosphorus-to-Group VI metal oxide in the finished catalyst is obtained by employing suitable concentrations of the phosphorus acid and the Group VI metal compound in the impregnating solution. Suitable concentrations will, of course, vary considerably with the particular Group VI and Group VIII metal compounds, the phosphorus acid, the carrier, the pH and temperature of the impregnating solution, method of effecting the impregnation, etc., and are best determined empirically. For example, the most preferred acid of phosphorus concentration will not generally be exactly the same in systems employing different forms of molybdenum or nickel.

Orthophosphoric acid is the preferred source of the phosphorus component of the catalyst of the invention. However, other phosphorus acids such as metaphosphoric acid, pyrophosphoric acid, phosphorus acid, etc., may be used. The compound of the Group VI metal, preferably molybdenum, can be any one of a combination of a variety of substances which have sufficient solubility in the solution to enable the deposition of the desired amount of metal. Illustrative compounds are the acids, oxides, and the simple and complex salts such as molybdenum trioxide, molybdenum blue, molybdic acid, ammonium dimolybdate, ammonium phosphomolybdate, ammonium heptamolybdate, nickel and cobalt containing molybdates and phosphomolybdates and the like. Molybdenum is presently preferred since the resultant components are the more active conventional components.

The presently preferred Group VIII metal sources are the salts of strong acid anions. Exemplary of such anions are nitrate, sulfate and the halides, particularly bromide, chloride and fluoride anions. This preference is due primarily to the fact that the strong acid anions dissociate on admixture with the solution to form the corresponding acid. The strong acids are necessary to reduce the pH to a point within the essential range, i.e., 1 to about 2, at the preferred concentration levels of the respective metal sources. The nitrates are presently the preferred source of the Group VIII metal, nickel nitrate being particularly preferred due to the high activity of the resultant catalyst. Ammonium heptamolybdate is the presently preferred molybdenum source due to its high solubility. The anions other than nitrates are generally less preferred due to significant difficulties associated with their use. For example, the halides, derived from the Group VIII metal halide source, are useful in preparing these compositions but result in the evolution of the acidic halide or hydrogen halide gas upon drying and/or calcination. These materials are highly corrosive and are preferably avoided. The sulfate, on the other hand, is somewhat more difficult to keep in the original solution, making it advisable to employ slightly elevated temperatures, i.e., from 100 to about 150° F., depending on the concentrations of the Group VIII metal sulfate. However, the use of the sulfate salt does have a distinct advantage. In the preparation of sulfided catalysts the conditions of calcination can be controlled so that the sulfate is not completely driven off and can be chemically reduced to produce a sulfided composite having a much more homogeneous distribution of sulfur than could otherwise be achieved. For example, the sulfate reduction can be conveniently carried out by exposing the calcined catalyst to a reducing atmosphere of hydrogen, carbon monoxide, etc.

A portion of the Group VIII metals can also be added in the form of salts of weak acids or as the hydroxides when it is desirable to raise solution pH. For example, if the admixture of the desired amounts of the active metal salts and acid of phosphorus results in a formation of a solution having a pH somewhat lower than desired in a particular application, the pH can be raised by the addition of a Group VIII metal base such as nickel or cobalt hydroxides and carbonates. However, this procedure is not presently preferred in that it requires the commensurate correlation of pH and active metal concentrations. As a result, it is presently more preferred to raise the pH when it is initially lower than desired by the addition of a base not having a metal cation, such as ammonia. In any event, where base addition is employed to modify the initial pH, the amount of added base should not be so great as to increase the pH to a value outside the prescribed range.

Several procedural steps can be employed in the impregnation of the catalyst substrate with the compositions referred to. One such method, entitled the spray technique, involves spraying the support with a solution of the desired composition. The single-dip or pore volume method involves dipping the support for a period sufficient to fill the pores with impregnating medium. The application of vacuum is generally preferred in the latter approach. The impregnating solution can more readily displace air trapped in the interior pore volume of the catalyst support at reduced pressures.

The amount of active components retained on the support will depend largely on the pore volume and adsorption capability of the support. Consequently, the characteristics of the support must be taken into account in determining the conditions necessary to obtain a composite of predetermined composition. In general, the preferred supports, e.g., alumina and silica-stabilized alumina, will have pore volumes of 0.6 to about 1.4 cc./gram and adsorption capacity sufficient to retain the desired amount of solution in a single step.

Some variation in pore size outside this range will be encountered with other supports within the general class of inorganic refractory oxides, e.g. combinations of silica and alumina such as natural and synthetic crystalline and amorphous aluminosilicates and gels such as silica-alumina and silica-magnesia, to which this invention is applicable. Pore size should also be taken into account in designing the most appropriate systems for the impregnation of a given support. As a general rule, more care should be taken in the preparation of relatively large pore size catalysts. Better deposit homogeneity and higher activity are obtained with longer aging times prior to drying and more gradual drying procedures. These observations are particularly applicable to the impregnation of acid leached supports in which a portion of the pores are usually fairly large.

Following either of these procedures the impregnated support can be dried and calcined to produce a catalyst having the desired active metal concentrations, provided the concentration of the active metals in the solutions is sufficient to deposit the desired amount of active metal compound on the support in a single step. This is one significant advantage of these novel solutions. The stability of solutions of much higher active component concentration can be maintained for considerable periods even in the presence of inorganic supports. When a single step approach is employed it is, of course, necessary to incorporate a definite amount of each active constituent into the medium and maintain the proper ratios between the several constituents per unit volume of solution in order to obtain a finished catalyst of the desired composition. It is also preferable to age the impregnated particles for at least about 30 minutes and preferably up to about 8 hours before drying and calcining. Aging after pore saturation, in the absence of excess solution, under mild conditions, i.e., 70° F. to about 150° F., results in more even distribution of active components and improved activity.

Additional precaution should be taken when a support material containing aluminum ions is exposed to excess solution at relatively low pH. It is believed that certain constituents of the impregnating solution, particularly the acid of phosphorus, react with aluminum and degrade the support, foul the impregnating solution and result in the formation of undesirable chemical forms on the finished catalyst. As a result, the extent of emersion, particularly in the presence of alumina containing supports, should not be excessive.

Another impregnating method which has found wide application due to the previous necessity for maintaining relatively low active component concentrations is the cyclic or multi-dip procedure wherein the active support is repeatedly contacted with impregnating solution with or without intermittent drying. As previously mentioned, this procedure is less desirable in that it necessitates the use of procedures far more complicated than the single-dip or spray technique. Yet another procedure employed by the prior art, which is not necessary with these impregnating solutions involves a prolonged contacting step at slightly elevated temperatures, e.g., 100 to 150° F., to promote the incorporation of active components onto the support.

In the circulation dip impregnation procedure the impregnating solution may be circulated through a bed or catalyst support particles until the required amount of the active constituents are deposited. A more dilute solution having a higher equivalent $P/MoO_3$ ratio and somewhat higher pH may be employed when using this technique and the active component concentration in the circulating solution can be replenished as necessary during the impregnation cycle in order to build up the desired concentration of active components on the support. Equivalent $P/MoO_3$ ratios as low as .05 and pH as high as 2.5 may be employed in this process, provided the total concentration of active constituents is reduced by a factor of at least 40% so that the equivalent Group VI and Group VIII oxide concentrations do not exceed 14 and 4 weight-percent, respectively. These reduced concentrations are necessitated by the greatly reduced stability of the impregnating solution due to the higher pH and lower $P/MoO_3$ ratios.

The exact concentration of the various constituents in the solution must be determined with regard to the final catalyst composition desired, the pore volume of the support particles and the time of contact of the support particles and the stability of the impregnating solution. A wide range of active component concentrations can be employed although some limitations are imposed by the selected impregnation procedure. Representative concentrations are 10 to 30 weight-percent $MoO_3$ and 1 to 10 weight-percent of the Group VIII oxides. The solutions employed in the pore saturation technique are necessarily relatively concentrated. Active component concentrations in those systems should be somewhat higher corresponding to 17 to about 30 weight-percent $MoO_3$ and 2 to about 8 weight-percent of the Group VIII metal oxide, and must be determined in relation to the desired composition of the final product. Nevertheless, the relative ratio of the Group VIII component to the Group VI component will generally be higher in these dilute systems when an excess of impregnating medium is employed. This is particularly true in the case of molybdenum, tungsten, nickel and cobalt. It has been observed that the Group VI component combines with the substrate more rapidly than does the Group VIII component. Consequently when deposition of the active components onto the substrate is effected at least in part by adsorption—as in the single dip and circulation dip techniques—the Group VIII to Group VI component ratio required to obtain a given final composition is higher than that required in the absence of selective adsorption effects. In contrast, the final Group VIII to Group VI component ratio is determined directly by solution composition when the pore saturation or spray techniques are employed. Selective adsorption effects are not determinative in these systems.

The pH of the solution will generally vary somewhat upon the addition of the Group VIII metal salt. The degree of such variation depends primarily upon the strength of the salt anion. For example, the addition of nickelous nitrate reduces the pH of the solution somewhat. The degree of this pH reduction is greater than that experienced when sulfate salts are employed due to the fact that the nitrate is the anion of a stronger acid than sulfuric acid. As a consequence of this effect, it is generally desirable to further adjust the final pH of the solution after addition of the Group VIII metal salt to the preferred value of from 1 to about 2, preferably from about 1.3 to about 1.7. If the pH of the final solution is lower than about 1 and higher than about 2, the stability of the final solution is reduced with the consequent appearance of precipitates or crystallites on the more concentrated solutions.

The desired stability of the impregnating solution is easily demonstrated by spreading a thin layer of the solution on a glass slide and allowing it to dry gradually under ambient conditions. The stable solutions prepared by the procedure herein described will dry to a completely amorphous transparent film as demonstrated by X-ray diffraction examination of the resultant film. Solutions not meeting these criteria do not form transparent thin films under conditions of this test but become opaque or translucent on drying due to precipitation and/or crystallization.

As illustrated by the examples hereinafter discussed, the catalysts prepared from the less stable impregnating solutions are far less active than those prepared from the solutions herein described. It appears that these differences in activity are attributable, at least in part, to the formation of crystallites and precipitates during impregnation. It is believed that this precipitation and crystallite formation results in the segregation of the several constituents into different crystalline species and the consequent formation of heterogeneous active component deposits. This type of segregation is prevented by the use of the impregnation solutions of this invention.

The term hydrogenative hydrocarbon conversion is intended to include all reactions such as those mentioned above in which hydrogen is reacted with conventional hydrocarbon feedstocks including all forms of hydrocarbons such as aliphatic, cycloaliphatic, olefinic, aromatic-including alkaryl and aralkyl aromatic compounds, in addition to organonitrogen and organosulfur compounds, particularly those found in conventional hydrocarbon feeds. The mechanisms involved in these systems include the reaction of hydrogen with carbon-to-carbon single bonds, carbon-to-carbon double bonds, aromatic rings, nitrogen-to-carbon and sulfur-to-carbon bonds or, in some cases, the reaction of hydrogen with either or both substituents adjacent the bond either during or after bond cleavage. As demonstrated by the examples hereinafter detailed the systems of this invention exhibit superior characteristics in the conduct of all of these reactions.

These hydrogenative conversion systems are generally characterized by the presence of substantial amounts of added hydrogen, conduct of the conversion under a superatmospheric hydrogen partial pressure and a net consumption of hydrogen which is of course reacted with the hydrocarbon feed. Within this class of reactions there is also included destructive hydrogenation, i.e., hydrocracking, in which sufficient carbon-to-carbon bond hydrogenation is effected to reduce a substantial proportion of the feed to materials boiling below the initial feed boiling point. These severe hydrogenation systems are distinguished from other hydrogenative reactions such as aromatics and olefin hydrogenation, denitrogenation and desulfurization, by the substantial reduction in initial boiling point of the hydrocarbon feed. For the purposes of this invention these severe hydrogenation systems, e.g., hydrocracking systems, involve the conversion of at least 20 volume percent of the hydrocarbon feed to materials boiling below the initial boiling point of the feedstock. In most commercial applications it is generally preferred to effect the conversion of at least 40 volume percent of the feed to materials boiling below the initial feed boiling point. However, at times, the hydrocracking systems can not be so characterized due to the inclusion of minor amounts of relatively low boiling materials in the original feedstock. In those situations, the hydrocracking systems of this invention are more readily distinguished from the relatively less severe hydrogenative conversion mechanisms by characterizing the number of moles of product produced relatively to the amount of feedstock reacted. For the purposes of this invention the systems involve the production of at least 110 moles of product for each 100 moles of hydrocarbon feed reacted. However, higher conversions involving the production of at least 120 moles of product for each 100 moles of feed are generally preferred. These reactions can be even further characterized by relatively higher net hydrogen consumption which usually exceeds about 250 standard cubic feet net hydrogen consumed per barrel of hydrocarbon feed.

The methods of this invention are particularly attractive for the conduct of the severe hydrocracking reactions when operating on feedstocks containing substantial amounts of organonitrogen compounds. Such feedstocks are usually characterized as containing at least about 2 and usually in excess of 10 parts per million of nitrogen and organonitrogen compounds. However, most commercial feedstocks have nitrogen concentrations in excess of 50 parts per million. The conversion systems of this invention are particularly attractive when operating on such high nitrogen feeds due to their high tolerance and activity toward organonitrogen compounds. In fact, the requirement of a pretreatment zone to reduce nitrogen concentrations to the levels required by other catalysts can be avoided by the use of these methods.

The methods of this invention are also very attractive for the conversion of feedstocks containing substantial amounts of aromatic constituents. This superiority is evidenced when operating on feeds containing as little as 5% aromatic compounds. However, most hydrocracking feedstocks contain at least about 10 volume percent aromatics, usually about 10 to about 80 volume percent.

Essentially any hydrocarbon feed which can be reacted with hydrogen in the presence of the described catalyst can be employed in the methods of this invention. For example, these methods can be employed to hydrogenate olefins such as ethylene, butenes, and cyclohexanes, dodecenes, alkylene substituted aromatics, and the like. However, as a general rule, these hydrogenative conversion methods are employed to convert feeds boiling primarily above about 100° F. In most applications the principal part of the feedstock will boil in excess of about 400° F., usually within the range of about 200 to 1100° F.

The reaction conditions required to substantially increase the hydrogen-to-carbon ratio will of course depend somewhat on the characteristics of the feedstock in that the nature of the hydrocarbons to be converted will determine the reaction mechanisms which must be effected in order to accomplish a significant degree of hydrogen consumption. However, the severity of these conditions can be readily determined by the skilled artisan simply by contacting the selected feedstock with the described catalysts at a selected set of operating conditions, analyzing the product and then varying the process conditions to obtain the desired degree of conversion and selectivity. As a general rule, reaction temperatures will be at least about 400° F., usually in excess of about 600° F. The most common conversion temperatures range from 400 to 950° F., especially 650 to 850° F. Reaction pressures of at least about 500 p.s.i.g., usually 500 to about 5000 p.s.i.g. are effective for accomplishing most desired reactions. Superatmospheric hydrogen partial pressures are always employed. Hydrogen is usually added in amounts corresponding to at least about 50 standard cubic feet per barrel, normally in excess of about 100 standard cubic feet per barrel. However, most hydrocarbon feeds will be effectively converted in the presence of hydrogen added in amounts of about 400 to about 20,000 standard cubic feet per barrel.

These hydrogen concentrations usually correspond to hydrogen partial pressures of at least about 50 p.s.i., generally about 100 to about 3000 p.s.i. depending on the feedstock and the nature of the conversion desired. For example, hydrofining conditions often include temperatures of 700 to 800° F., and hydrogen partial pressures of about 750 to 2000 p.s.i.

The duration over which the hydrocarbon feed is maintained in contact with the catalysts at conversion conditions will also vary considerably depending upon the nature of the reaction conducted and the extent of conversion and selectivity desired. However, for most systems contact times in excess of about 1 minute are usually required while reaction times of at least 5 minutes are generally preferred. In fixed bed catalyst systems the described degree of contacting is usually effected at liquid hourly space velocities (LHSV) in excess of about 0.1, usually in excess of about 0.4 and generally within the range of about 0.4 to about 15.

The following examples serve to more particularly illustrate the invention and the advantages thereof.

Examples 1–7

The catalysts of these examples were all prepared by identical procedures, with the only variables being the proportions of the ingredients, the corresponding impregnation medium, pH and the carrier. Silica-stabilized alumina containing 4.95% silica was employed in Examples 1–3. Alumina stabilized with 6.63% silica was used in Examples 4–7. The catalysts were prepared by a single-dip procedure in which the carrier, in the form of $\frac{1}{16}''$ pellets, was immersed in an aqueous impregnation solution containing ammonium heptomolybdate, nickelous nitrate hexahydrate and orthophosphoric acid, and having the equivalent oxide concentrations reported in Table 1. The particles were contacted for the designated period under house vacuum, (22–25 mm. Hg) on a #5 Büchner funnel. The catalysts were then dried and activated by heating at a rate of 50° F./hr. up to 900° F. at which they were maintained for 2 hours. Each of the catalysts was activated by the preferred calcination procedure by intimately contacting the impregnated pellets with 6 to 8 s.c.f. of ambient air at about 70° F. inlet temperature per pound of catalyst per minute throughout the period of drying and calcination.

The calcination was carried out in a muffle furnace fitted with a fine screen rack on which the specimen was spread in a thin layer, no deeper than about $\frac{1}{2}''$, through which air was passed during drying and calcining. About 500 to 1000 grams of wet impregnated catalyst particles were placed on a stainless steel screen, 15 x 15" square having less than 10 mesh per inch. This screen is supported on a perforated stainless steel tray positioned on a furnace rack in an electrically heated vertical draft oven having an air inlet at the base. Air was blown into the bottom of the furnace at a rate of 4 to 12 standard cubic feet per minute and passed up through the furnace and through the bed of catalyst supported on the porous screen.

The hydrofining activity of each catalyst was determined by passing a mixed gas oil over a fixed bed of catalyst at a temperature of 725° F., a pressure of 1400 p.s.i.g., space velocity of 2.0 LHSV and a hydrogen rate of 6000 s.c.f./barrel of feed. The mixed gas oil feed had a boiling point range of 400 to 900° F., an API gravity of 23.2 and contained 1.19 weight-percent sulfur and 0.195 weight-percent nitrogen. The residual basic nitrogen in the liquid product, after scrubbing with 5% sodium hydroxide, was monitored and used to calculate percent activity with reference to a standard catalyst by the following equation:

$$\text{Log}\left(\frac{B_N \text{ Feed}}{B_N \text{ Product (from ``X'' Cat.)}}\right) \div \text{Log}\left(\frac{B_N \text{ Feed}}{B_N \text{ Product (from Ref. Cat.)}}\right)$$

$$\times 100 = \% \text{ Activity}$$

Percent denitrogenation was also calculated from the total nitrogen in the product average over the last 12 hours on the feed. Results are given in Table I in which the denitrogenation (DeN) activities are expressed as volume percent and weight percent relative to the activity of the reference catalyst. The latter is a commercial hydrotreating catalyst consisting of 16.4% $MoO_3$, 2.9%

NiO, and 1.3% P on gamma alumina stabilized with 4.5 weight-percent silica. This catalyst was prepared by impregnating the support with an aqueous system containing 17.4 weight-percent $MoO_3$ as ammonium heptamolybdate and 3.5 weight-percent NiO as nickel nitrate with a $P/MoO_3$ weight ratio of 0.085 at a pH greater than 2.6.

by comparison with the reference catalyst produced under conditions preferred by the prior art.

Examples 8–21

These investigations were conducted to evaluate the effect of impregnating solution composition on the sta-

TABLE 1

COMPOSITIONS AND DENITROGENATION ACTIVITIES OF CATALYSTS OF EXAMPLES

|  | Ex. 1 | Ex. 2 | Ex. 3 | Ex. 4 | Ex. 5 | Ex. 6 | Ex. 7 | Reference catalyst |
|---|---|---|---|---|---|---|---|---|
| Solution composition wt. percent: |  |  |  |  |  |  |  |  |
| $MoO_3$ | 17.8 | 25.4 | 20.4 | 20.4 | 20.4 | 17.8 | 19.8 | 17.4 |
| NiO | 3.9 | 4.0 | 3.7 | 3.7 | 3.7 | 3.9 | 4.1 | 3.5 |
| P | 2.5 | 2.3 | 2.8 | 2.8 | 2.8 | 2.50 | 3.5 | 1.5 |
| $P/MoO_3$ | 0.140 | 0.091 | 0.136 | 0.136 | 0.136 | 0.140 | 0.176 | 0.085 |
| pH | 1.9 | 2.0 | 1.3 | 1.3 | 1.3 | 1.9 | 1.3 | 2.6 |
| Contact time, min | 15 | 15 | 15 | 15 | 15 | 15 | 120 | 15 |
| Catalyst composition wt. percent: |  |  |  |  |  |  |  |  |
| $MoO_3$ | 15.2 | 21.7 | 18.4 | 18.2 | 19.5 | 18.4 | 16.9 | 16.3 |
| NiO | 2.95 | 3.07 | 2.97 | 2.96 | 2.88 | 2.93 | 2.82 | 2.8 |
| P | 2.81 | 2.40 | 2.96 | 3.04 | 3.41 | 3.26 | 3.58 | 1.30 |
| $P/MoO_3$ | 0.185 | 0.110 | 0.162 | 0.166 | 0.175 | 0.175 | 0.210 | 0.080 |
| Activity weight of catalyst, g | 164 | 175 | 171 | 171 | 175 | 151 | 167 | 146 |
| Vol. percent of DeN activity | 140 | 123 | 150 | 154 | 137 | 140 | 143 | 100 |
| Wt. percent of DeN activity | 125 | 103 | 128 | 132 | 116 | 127 | 125 | 100 |
| Percent DeN | 95.41 | 94.00 | 96.87 |  | 96.21 | 96.56 | 96.67 | 91.8 |

The volume percent activity of the catalyst of Example 1, in which the $P/MoO_3$ ratio was 0.185 and the initial pH of the solution was 1.9, was 140% of the reference catalyst. The catalyst of Example 2, in which the $P/MoO_3$ weight ratio in the product was only 0.11 and the initial pH of the impregnating medium was 2.0, had an activity of only 123 volume percent of the reference catalyst. This difference was even more pronounced on a weight basis of conversion, i.e., 123 versus 103. The catalyst of Example 1 was the most active even though it contained less active metal. The catalyst of Example 3 prepared at an initial solution pH of 1.3 and a $P/MoO_3$ solution ratio of 0.136 exhibited even higher activity. Example 4, similar to Example 1 in $MoO_3$ content, $P/MoO_3$ ratio and solution bility of the amorphous deposits formed in accordance with the method of this invention. Each of these solutions was prepared by dissolving ammonium heptamolybdate and phosphoric acid (85%) in water in the proportions reported in Table 2. The indicated amount of nickelous nitrate hexahydrate was then added to the solution. In several instances the pH of the final solution was adjusted upwardly by the addition of ammonium hydroxide in amounts sufficient to produce the indicated pH change. Each solution was aged overnight (12 hours) at 75° F. in glass bottles. Equal portions of each fresh solution were also deposited on glass slides and dried gradually at 75° F. Visual observations for both of these tests are reported in Table 2.

TABLE 2

| Example No. | 8 | 9 | 10 | 11 | 12 | 13 | 14 | 15 | 16 | 17 | 18 | 19 | 20 | 21 |
|---|---|---|---|---|---|---|---|---|---|---|---|---|---|---|
| Ammonium heptamolybdate, g | 41.0 | 41.0 | 41.0 | 41.0 | 41.0 | 41.0 | 41.0 | 41.0 | 41.0 | 41.0 | 41.0 | 41.0 | 25.5 | 41.0 |
| $MoO_3$, g | 33.6 | 33.6 | 33.6 | 33.6 | 33.6 | 33.6 | 33.6 | 33.6 | 33.6 | 33.6 | 33.6 | 33.6 | 20.91 | 33.6 |
| Phosphoric acid (85%), g | 7.0 | 10.4 | 12.0 | 17.0 | 17.5 | 22.0 | 22.0 | 27.0 | 27.0 | 17.0 | 22.0 | 27.0 | 6.6 | None |
| P, g | 1.88 | 2.80 | 3.23 | 4.57 | 4.70 | 5.91 | 5.91 | 7.26 | 7.26 | 4.57 | 5.91 | 7.26 | 1.77 |  |
| Water approx., ml | 75 | 75 | 75 | 75 | 75 | 75 | 75 | 75 | 75 | 75 | 75 | 75 | 75 | 75 |
| pH | 4.5 | 3.5 | 2.9 | 1.7 | 1.75 | 1.6 | 1.5 | 1.4 | 1.45 | 1.75 | 1.45 | 1.20 | 3.7 | 5–6.0 |
| Nickelous nitrate hexahydrate, g | 24.0 | 24.0 | 24.0 | 24.0 | 24.0 | 24.0 | 24.0 | 24.0 | 24.0 | 24.0 | 24.0 | 24.0 | 16.5 | 24.0 |
| NiO, g | 6.16 | 6.16 | 6.16 | 6.16 | 6.16 | 6.16 | 6.16 | 6.16 | 6.16 | 6.16 | 6.16 | 6.16 | 4.24 | 6.16 |
| Total volume of solution, ml | 120 | 120 | 120 | 120 | 120 | 120 | 120 | 120 | 120 | 110 | 110 | 100 | 120 | 120 |
| pH | 3.5 | 2.3 | 1.9 | 1.3 | 1.25 | 1.15 | 1.1 | 1.05 | 1.0 | 1.3 | 1.0 | 0.9 | 2.6 | ~4 |
| Adjust pH with $NH_4OH$ | None | None | None | None | 1.60 | None | 1.60 | None | 1.70 | 2.3 | 2.3 | 2.3 | None | None |
| Final volume, ml | 120 | 120 | 120 | 120 | 123.5 | 120 | 125 | 120 | 132 | 120 | 121 | 118 | 120 | 120 |
| $MoO_3$, g./cc | 0.2825 | 0.2825 | 0.2825 | 0.2825 | 0.280 | 0.2825 | 0.268 | 0.2825 | 0.255 | 0.2825 | 0.2825 | 0.2825 | 0.1742 | 0.2825 |
| NiO, g./cc | 0.0517 | 0.0517 | 0.0517 | 0.0517 | 0.0515 | 0.0517 | 0.0512 | 0.0517 | 0.047 | 0.0517 | 0.0517 | 0.0517 | 0.0353 | 0.0517 |
| P, g./cc | 0.0157 | 0.0233 | 0.0269 | 0.0384 | 0.0380 | 0.0493 | 0.0472 | 0.0605 | 0.055 | 0.0380 | 0.0472 | 0.0605 | 0.0148 |  |
| $P/MoO_3$ wt. ratio | 0.056 | 0.083 | 0.095 | 0.136 | 0.136 | 0.176 | 0.176 | 0.216 | 0.216 | 0.136 | 0.176 | 0.216 | 0.085 | 000 |
| Dried film on glass slide | Yellowish opaque | | | (1) | (1) | (1) | (1) | (2) | (1) | Film cracking | | | (3) |  |
| Solution characteristics after 12 hours | Crystalline deposit. Yellow fine crystalline precipitate | | | (4) | (5) | (4) | (4) | (5) | (4) | (6) | (6) | (6) | (7) | (8) |

1 Transparent.
2 Slightly apaque.
3 Opaque yellow.
4 Clear
5 Trace sediment.
6 Glass bottles containing the 3 solutions were lined with crystalline material. pH is too high for stable solution.
7 Precipitate with yellow fines formed slowly.
8 White precipitate begins to form in 5–10 min. Voluminous after 1 hour.

pH but employing a different carrier, had an activity similar to Example 1. Example 5, in which the equivalent NiO content was somewhat lower and the initial solution pH was 1.3 had lower activity than Example 4, but was still considerably more active than the low $P/MoO_3$ ratio catalyst of Example 2. Examples 6 and 7 impregnated at pH of 1.9 and 1.3 respectively, show that a further increase in the $P/MoO_3$ ratios to 0.175 and 0.21, respectively, does not result in any further increase in activity. In fact, the activities of these examples was less than that of Examples 3 and 4. The markedly higher activity of the catalysts prepared from impregnating solutions having pH values, $P/MoO_3$ ratios and active component concentrations within the prescribed limits is readily apparent The impregnating solutions of Examples 8, 9 and 10 were all unstable as indicated by the formation of yellowish opaque precipitates on the glass slides and the formation of yellow fine crystalline deposits in the solutions aged for 12 hours at 75° F. The observed instability is believed to be attributable to the low solution $P/MoO_3$ weight ratios, all of which are below the minimum of about 0.10 necessary to obtain the advantages of this invention. It is interesting to note, however, that these ratios are equivalent to those considered preferable by the prior art. In addition, the solutions of Examples 8 and 9 had pH values of 3.5 and 2.3, respectively, both of which exceed the maximum pH of 2.0 tolerable in these relatively concentrated solutions. The precipitate formation observed in Example 10 at a pH of 1.9 and P/MoO$_3$ weight ratio of 0.095 was much slower than that observed in either Examples 8 or 9, although the dried film definitely exhibited an opaqueness characteristic of a heterogeneous or crystalline system. The presence of precipitate in the aged solution was apparent after 12 hours. Although the degree of instability was reduced by reducing the pH to 1.9 in Example 10, the P/MoO$_3$ weight ratio was so far below the necessary minimum of about 0.1 that some instability was apparent in the dried film and aged solution.

Examples 11 through 14 were conducted at conditions of pH and P/MoO$_3$ ratio within the limits prescribed by this discovery and illustrated remarkable stability in both the dried films and aged solutions. A trace amount of precipitate was observed in the solution of Example 12 after 12 hours of aging at 75° F. However, there was no concurrent opaqueness in the dried film and the aged solution was evidently far more stable than the solutions of Examples 8–10. The presence of the trace precipitate in the aged solution of Example 12 is attributed to the addition of sufficient ammonium hydroxide to increase the pH from the original value of 1.25 to the final value of 1.60. It is believed that the presence of ammonium hydroxide in solutions having P/MoO$_3$ ratios approaching the lower prescribed limit of about 0.1, i.e., 0.136 in Example 12, tends to reduce the stability of those solutions. This conclusion is borne out by Example 14 in which sufficient ammonium hydroxide was added to the solution to increase the pH from the original value of 1.1 to a final pH of 1.60. The P/MoO$_3$ ratio in that preparation was 0.176 which was high enough to counteract the effect of base addition as indicated by the complete absence of any opaqueness or precipitate in either the dried film or aged solution.

Comparison of Examples 15 and 16 provides a dramatic illustration of the advantage obtained by increasing solution of pH with basic media. The solution of Example 15 having a pH approaching the minimum prescribed limit and a P/MoO$_3$ weight ratio approaching the upper limit prescribed for that parameter was somewhat less stable than the solutions of Examples 11–14. The dried film exhibited a slightly opaque appearance and trace amounts of solid sediment were present in the aged solution. Although solutions of this nature are less preferred, they are still far superior to the solutions envisioned by the prior art and illustrated by Example 20. That solution, having a pH of 2.6 and a P/MoO$_3$ ratio of 0.085 produced an opaque yellow heterogeneous deposit on the glass slide. The formation of fine yellow particulate matter was evident in the aqueous solution throughout the aging period. The significance of the poor stability of that solution is even more apparent when it is observed that the total metals concentration in Example 20 was about 85% less than the stable solution of this invention. Obviously the tendency toward precipitation is greater at higher concentrations. Yet the solutions of this invention remained stable at concentrations about 80% higher than those at which substantial instability was observed in Example 20.

It should also be observed that the value of this distinction becomes even more apparent in the context of catalyst preparation systems. The savings in time and investment alone afforded by single-step impregnation techniques are apparent. Yet the application of such techniques requires the use of impregnating solutions of relatively high concentrations to enable the deposition of the desired amounts of active components. The markedly superior compositions of this invention enable the use of those systems to produce catalysts of superior activity.

The composition of Example 16 having a P/MoO$_3$ weight ratio identical to Example 15 and an initial pH of 1.0 was further treated by the addition of sufficient ammonium hydroxide to increase the pH to 1.70. The resultant solution was very stable and produced a completely transparent dried film. The aqueous solution remained completely clear even after aging for 12 hours.

The effect of higher pH on the stability of impregnating solutions having active component concentrations sufficient to enable the use of single-step impregnating methods is illustrated by Examples 17–19. Several P/MoO$_3$ ratios were investigated in these examples. All three of these solutions having pH values of 2.3 and P/MoO$_3$ ratios representative of the prescribed range were much less stable than the solutions of Examples 11–16. The formation of opaque cracked films and substantial crystallization in the aged solutions were observed in each instance.

The solution of Example 21 provides a contrast between the stable solutions having pH values and P/MoO$_3$ ratios within the necessary limits to similar prior art solutions prepared at higher pH in the absence of an acid or phosphorus.

Examples 22 and 23

These two examples illustrate the influence of aging the substrate in contact with impregnating medium on the activity of the resultant catalyst.

A solution containing 410 grams of ammonium heptamolybdate, 210 grams of 85% orthophosphoric acid and 220 grams of nickelous nitrate hexahydrate made up to a total volume of 950 ml., and pH adjusted to 1.3 by the addition of several ml. of concentrated ammonium hydroxide was dripped from a separatory funnel onto 1300 grams of silica-stabilized alumina extrudates in an evacuated 4-liter flask. The flask was vigorously shaken by hand during and after the addition of the solution to aid in its distribution. This volume of solution was enough to fill the pore volume of the extrudates and wet them enough so that they adhered to each other and the flask. There was no free liquid in the flask. The agitation under vacuum was continued for 20 minutes. The temperature of the wet extrudates increased from about 77° F. to about 122° F. during this period of time. The wetted and impregnated extrudates were divided into two parts.

A 1000 gram portion of the impregnated extrudates which had been aged for 20 minutes was spread on a stainless steel screen tray in the Kress box muffle furnace and dried at 200° F. for 16 hours. The dried pellets were then distributed on a stainless steel screen suspended within a top-opening Kress muffle furnace and heated at a controlled rate of 50° F. per hour to 900° F., at which temperature they were maintained for two additional hours. Throughout the entire drying and calcination period ambient air, having an inlet temperature of 75° F. was passed into the bottom of the furnace and over the pellets at a rate of about 7 standard cubic feet per minute per pound of catalyst.

The remaining material in the 4-liter impregnating flask was aged under ambient conditions with occasional shaking by hand for an additional 100 minutes. The impregnated and aged extrudates were then distributed on a 15" square stainless steel tray and placed in an oven at ambient conditions. The oven was turned on and heated to 200° F. and the catalyst was held in the oven overnight (16 hours). House vacuum was applied to draw through the oven during this period. The dried extrudates were then calcined in the Kress box-type muffle as described above. The composition and activity of these two catalysts were determined as in Example 3 and are compared in Table 3.

TABLE 3

| Example No. | Aging time, minutes | Composition, wt. percent | | | Activity test | |
|---|---|---|---|---|---|---|
| | | MoO | NiO | P | Hours | Percent activity |
| 22 | 20 | 18.4 | 3.09 | 2.97 | 60 | 132 |
| 23 | 120 | 17.7 | 3.13 | 2.94 | 60 | 150 |

These results demonstrate that considerable advantage can be achieved by aging catalysts impregnated by single step pore saturation.

The following two examples are a parallel comparison of the prior art catalyst in the system of this invention further demonstrating the superiority of these hydrogenative conversion systems for desulfurization and denitrogenation.

Example 24

The catalyst of this example was similar to the reference catalyst discussed in Table 1 and was prepared by impregnation of an alumina support stabilized with 5.0 weight-percent silica with an aqueous solution containing ammonium heptamolybdate, nickelous nitrate hexahydrate, cobalt nitrate and orthophosphoric acid in amounts corresponding to about 17.4 weight-percent $MoO_3$, about 3.5 weight-percent NiO, about 0.4 weight-percent CoO and about 1.5 weight-percent P. The impregnated composition containing 16.0 weight-percent $MoO_3$, 3.1 weight-percent NiO, 0.2 weight-percent CoO, and about 1.3 weight-percent P on an equivalent total weight basis was then thermally activated as described in Examples 1 through 7. The activity and tolerance of this composition in desulfurization and denitrogenation applications was determined by operating on the blended feedstock hereinafter described at about 90% sulfur conversion per pass at several different temperatures and liquid hourly space velocities. The feedstock employed in this operation was a blend of 84 volume percent cat-cycle oil and 16 volume percent heavy cat-gasoline boiling between 350 and 650° F., having an API gravity of 23.0 and containing 1.75 weight-percent original sulfur and 300 parts per million total nitrogen. This feed was contacted with the described catalysts in a single-stage, single pass system with once through hydrogen. Consequently, the hydrogen stream was doped with an amount of carbon disulfide equivalent to 2.4 volume percent $H_2S$ in the hydrogen feed to approximate commercial desulfurization and denitrogenation conditions existing with hydrogen recycle systems.

The conditions and results of this operation are summarized in Table 4.

Example 25

The catalyst of this example which is representative of the compositions and methods of this invention was prepared by impregnating a gamma alumina support stabilized with 3.0 weight-percent silica with an aqueous solution of ammonium heptamolybdate, nickelous nitrate hexahydrate, and orthophosphoric acid in amounts corresponding to about 24.0 weight-percent $MoO_3$, about 3.7 weight-percent NiO, and about 3.8 weight-percent P having an equivalent $P/MoO_3$ weight ratio of about 0.158 and an initial solution pH of about 1.2. The support was impregnated by pore saturation, aged at least 2 hours, dried in a through-circulation belt dryer in 30 to 40 minutes and finally calcined at a temperature of 900 to 950° F. in an indirect fired rotary calciner with accelerated air flow. The resultant catalyst contained 16.5 weight-percent $MoO_3$, 2.84 weight-percent NiO, and 2.8 weight-percent P corresponding to an equivalent $P/MoO_3$ ratio of 0.167 on equivalent total weight basis. Desulfurization was conducted under conditions paralleling those of Example 24 as summarized in Table 4.

TABLE 4

| Operating conditions: | | | |
|---|---|---|---|
| LHSV, hr.$^{-1}$ | 3.5 | 7.0 | 3.0 |
| Temperature, °F | 700 | 700–780 | 750–790 |
| $H_2$/oil, s.c.f./bbl | 1,700 | 1,700 | 1,700 |
| Relative deactivation rate, °F./100 hours: | | | |
| Example 24 | Nil | 40 | 12 |
| Example 25 | Nil | 24 | 8 |

The data summarized in Table 4 indicate that the deactivation of both catalysts was negligible at relatively mild conditions of 700° F. and 3.5 LHSV. There would definitely be some deactivation for both of these systems at these mild conditions. However, the length of the operation undertaken in this example was not of sufficient duration to allow extrapolation of deactivation rate to a 100 hour run length. However, a dramatic difference in the tolerance of each of these systems in hydrogenative desulfurization application was demonstrated at more severe conditions involving temperatures of 700 to 780° F. and liquid hourly space velocities of 7.0. At these conditions the results demonstrate that the methods of this invention deactivated only 24° F. in 100 hours as compared to 40° F. for the comparison method. The deactivation rate in Example 24 was roughly twice that observed in Example 25. About a 60% difference was observed at less severe conditions involving approximately the same temperatures, e.g., 750 to 770° F., at lower space velocities, e.g., 3.0 LHSV. At these conditions the method of this invention exhibited a deactivation rate corresponding to a temperature increase requirement (TIR) of 8° F. as compared to 12° F. for the system of Example 24.

Several conclusions can be readily derived from these observations. Firstly, it is apparent that the rate of deactivation is greatly accelerated at higher temperatures and/or higher liquid hourly space velocities. In other words, the ability of either system to hydrogenatively desulfurize hydrocarbons is reduced at a much higher relative rate at higher temperatures. The same is true at higher liquid hourly space velocities. Secondly, it is apparent that the method of this invention deactivates at a dramatically slower rate than previously available methods. As a consequence, previously available systems require much higher temperatures to maintain the same conversion that can be maintained at lower temperatures with the methods of this invention. This distinction is amplified by the fact that deactivation is greatly accelerated at higher temperatures. Consequently, the activity difference between these two systems is magnified with run length.

The following four examples demonstrate the superiority of the methods of this invention with regard to the conduct of several additional hydroconversion processes including in particular hydrocracking, hydrogenation, desulfurization and denitrogenation.

All of these examples were conducted on the feedstock having the properties illustrated in Table 5.

TABLE 5.—FEED PROPERTIES

| | |
|---|---|
| Gravity, ° API | 17.9 |
| ASTM distillation, D-1160, ° F.: | |
| IBP/5 | 512/567 |
| 10/20 | 589/610 |
| 30/40 | 638/645 |
| 50/60 | 683/704 |
| 70/80 | 731/757 |
| 90/95 | 806/839 |
| Max/rec, vol. percent | 857/98 |
| Sulfur, X-ray, wt. percent | 3.54 |
| Nitrogen: | |
| Total, wt. percent | 0.183 |
| Basic, wt. percent | 0.0681 |
| Acid solubility, vol. percent | 68.5 |
| Universal high mass, wt. percent: | |
| Total saturates | 19.1 |
| Paraffins | 0.4 |
| Mononaphthenes | 8.8 |
| Polynaphthenes | 19.9 |
| Total aromatics [1] | 31.6 |
| Monoaromatics | 14.4 |
| Diaromatics | 10.7 |
| Triaromatics | 9.6 |
| Tetraaromatics | 5.2 |
| Pentaaromatics | 2.3 |
| Total sulfur compounds | 18.2 |
| Monobenzothiophenes | 5.3 |
| Dibenzothiophenes | 2.7 |
| Tribenzothiophenes | 1.4 |
| Aromatic sulfides | 0.5 |
| Alkyl sulfides | 4.3 |
| Thiophenes | 4.0 |
| Total oxygen plus nitrogen | 5.3 |
| Olefins | 15.6 |
| UV-LEC saturate separation, wt. percent: | |
| Saturates | 29.1 |
| Aromatics plus sulfur compounds | 49.0 |
| Oxygen plus nitrogen hetero compounds | 6.3 |
| Olefins | 15.6 |

[1] Excludes 9.9% of total aromatics present as sulfur compounds and reported as such.

Example 26

The catalyst of this example was prepared in accordance with the procedures described in Example 24 and had a composition equivalent to 15.6 weight-percent $MoO_3$, 3.2 weight-percent NiO, and about 1.3 weight-percent P. The composition was prepared by pore saturation impregnation followed by drying and calcining as in Example 25 in the absence of excess air flow in the calciner.

This catalyst was used to convert the feed identified in Table 5 in a fixed bed catalyst system operating once through with a single stage at 740° F., 1275 p.s.i.g., a liquid hourly space velocity (LHSV) of 0.59 and a hydrogen injection rate of 6000 standard cubic feet per barrel of hydrocarbon feed. The results of this operation are summarized in Table 6.

Example 27

The hydrogenative conversion of Example 26 was repeated using the catalyst described in Example 26 and the feedstock identified in Table 5 at a reduced temperature of 715° F. to provide a comparison between these methods at somewhat less severe conditions. The results of this operation are also summarized in Table 6.

Example 28

The method demonstrated in this example employed a catalyst prepared by the circulation dip method using a solution containing 13.4 wt. percent $MoO_3$, about 3.6 wt. percent NiO, about 1.2–1.3 wt. percent P and having an initial pH of about 2.5 and a $P/MoO_3$ ratio of about 0.11. The finished catalyst had an equivalent composition of 16.6 weight-percent $MoO_3$, 3,27 weight-percent NiO, and 3.09 weight-percent P on gamma alumina stabilized with 4.5 weight-percent silica. This catalyst was used to convert the feed identified in Table 5 in a single-stage once through system using hydrogen at conditions otherwise identical to those described in Example 26. The results of this operation are summarized in Table 6.

Example 29

The hydrogenative conversion described in Example 28 was repeated at conditions of less severity at a temperature of 715° F. to provide a comparison to the method demonstrated in Example 27. The results of this operation are summarized in Table 6 along with the results of Examples 26 through 28.

TABLE 6

| Example No. | 26 | 27 | 28 | 29 |
|---|---|---|---|---|
| Conditions: | | | | |
| Reactor temperature, °F | 740 | 715 | 740 | 715 |
| Reactor pressure, p.s.i.g | 1,275 | 1,275 | 1,275 | 1,275 |
| LHSV, v./v./hr | 0.59 | 0.59 | 0.59 | 0.59 |
| Hydrogen, s.c.f./bbl | 6,000 | 6,000 | 6,000 | 6,000 |
| Product properties: | | | | |
| Full range product: | | | | |
| Acid solubility, vol. percent | 33.2 | 33.9 | 26.4 | 27.0 |
| Total nitrogen, p.p.m | 19 | 35 | 0.9 | 1.2 |
| Total aromatics, wt. percent | (40.5) | (41.1) | (34.9) | (38.3) |
| X–375° F. fraction: | | | | |
| Weight percent of product | 6.4 | 3.9 | 11.9 | 6.5 |
| Aromatics: | | | | |
| Wt. percent of fraction | (20) | (22) | (15) | (21) |
| Wt. percent of total | (1.3) | (0.9) | (1.8) | (1.3) |
| 375–575° F. fraction: | | | | |
| Weight percent of product | 31.3 | 29.0 | 41.0 | 38.8 |
| Aromatics: | | | | |
| Wt. percent of fraction | (50) | (50) | (45) | (50) |
| Wt. percent of total | (15.7) | (14.5) | (18.4) | (19.4) |
| 575° F.—plus fraction: | | | | |
| Weight percent of product | 62.2 | 67.2 | 46.0 | 54.6 |
| Aromatics, wt. percent of fraction: | | | | |
| Monoaromatics | 26.9 | | 22.9 | |
| Diaromatics | 6.5 | | 5.5 | |
| Triaromatics | 3.4 | | 2.5 | |
| Tetraromatics | 0.1 | | 0.1 | |
| Total, percent of fraction | 37.8 | 38.3 | 31.9 | 32.3 |
| Total, percent of total | 23.5 | 25.7 | 14.7 | 17.6 |
| Sulfur, p.p.m | 28 | 113 | 14 | 39 |

The data presented in Table 6 illustrate several superior qualities of the methods of this invention, the most significant of which are superior denitrogenation, desulfurization, hydrocracking and hydrogenation. Dramatically superior hydrocracking activity is illustrated by the relative amounts of product obtained in the X–375° F. and 375–575° F. fractions. In consideration of these results it should be observed that about 7% of the original feedstock identified in Table 5 boils below 575° F. Consequently that amount of material did not have to be converted to be found in the 375–575° F. fractions. Subtracting the amount of this fraction present in the original feed, i.e., 7%, renders the distinction between the method of this invention (Examples 28 and 29) and the comparison system (Examples 26 and 27) much more representative. On this basis a comparison of the 375–575° F. fractions of Examples 26 and 28 demonserates that 24.3% of the original feed was converted to products boiling within this range in Example 26. In contrast, 34% was converted in Example 28 representing an advantage of more than 40 relative percent for the method of this invention.

A more direct comparison is provided by consideration of the X–375° F. fraction. Again considering Examples 26 and 28 having relative conversions of 6.4 and 11.9 weight-percent respectively to the lower boiling fraction, the method of this invention demonstrated a relative advantage in hydrocracking activity of 86%. In other words, the method of this invention converted 86% more material to the X–375° F. fraction than did the comparison method demonstrated in Example 26.

Similar proof is provided by comparison of the relative amounts of material remaining in the 575-plus fraction. Comparison of Examples 26 and 28 wherein the relative amounts of product remaining in the 575° F.-plus fraction were 62.2 and 46.0 weight-percent, respectively, indicates that the method of this invention exhibited an overall advantage of 35 relative percent for converting the feed to products boiling below 575° F. Examples 27 and 29 provide similar demonstrations of the superiority of this method.

The superiority of the methods of this invention as regards desulfurization is demonstrated by comparison of either Examples 26 and 28 or Examples 27 and 29. In the first instance the method of this invention reduced the sulfur content of the feed to 14 parts per million as compared to 28 parts per million for the comparison system. On a simple arithmatic basis these results appear to indicate an advantage of about 100% for the methods of this invention. However, it should be kept in mind that desulfurization rate as reflected in ultimate sulfur concentration is necessarily a function of the amount of sulfur remaining to be converted. This is of course the case in considering the kinetics of any reaction mechanism other than zero order. Consequently it must be concluded that the method of this invention is even more than 100% more active than the comparison of Examples 27 and 29 which were conducted at less severe conditions at a temperature of 715° F. At the lower temperatures the remaining sulfur concentrations were somewhat higher indicating a lower rate of conversion for both systems. Nevertheless, the method of this invention reduced the remaining sulfur concentration to 39 parts per million as compared to 113 parts per million for the comparison method of Example 27. This comparison indicates a relative advantage of about 190% on a simple arithmatic basis for the method of this invention demonstrating that the apparent distinctions between these methods are indeed amplified at higher remaining reactant concentration levels.

These examples demonstrate an even more marked improvement for denitrogenation activity. The method of this invention reduced the nitrogen concentration of the product to 0.9 to 1.2 parts per million in Examples 28 and 29, respectively. This performance compares to total product nitrogen concentrations of 19 and 35 parts per million, respectively, for the comparison methods of Examples 26 and 27.

A further demonstration of the superior hydrogenative conversion activity of the methods of this invention is provided by comparison of the aromatics conversion obtained in Examples 28 and 29 as opposed to that observed in Examples 26 and 27. Again, in making this comparison, reference must be made to the characteristics of the original feedstock. The total aromatics concentration of the feed was about 41.5 weight-percent including the sulfur containing aromatic precursors, i.e., monobenzothiophenes, dibenzothiophenes, tribenzothiophenes and aromatic sulfides. Comparison of the total aromatics concentration in the products of Examples 26 and 27 to the aromatics concentration of the feed illustrates that the comparison method was at best able to convert only a nominal amount of the aromatics in the original feed at 715° F. in Example 27 corresponding to a relative conversion of less than 1%. A somewhat higher although still nominal conversion of about 2.4% was obtained in Example 26. In contrast, the relative aromatic conversions obtained by the methods of this invention in Examples 28 and 29 were 18.3 and 7.7%, respectively. From these comparisons it is readily apparent that the hydrogenation activity of the methods of this invention is many times greater than that exhibited by the comparison method. This distinction is amplified even more when it is observed that the aromatics remaining in the product obtained in Examples 28 and 29 were reduced to products boiling below 575° F. to an extent greater than that observed in the comparison methods of Examples 26 and 27. For example, 20.2 and 20.7% of the product boiling below 575° F., in Examples 28 and 29, respectively, was aromatic as opposed to only 17.0 and 15.4% for Examples 26 and 27, respectively. This evidence illustrates that the aromatics remaining in the products of Examples 28 and 29 were at least partially converted presumably by hydrogenation of one or more aromatic nuclei, to a greater extent than that observed in Examples 26 and 27. This conclusion is also supported by the lower relative total aromatics concentration in the 575° F.-plus fraction and the lower relative concentrations of diaromatics and triaromatics in that product.

Numerous variations and modifications of the concept of this invention will be apparent to one skilled in the art in view of the aforegoing disclosure and the appended claims.

What is claimed is:

1. The method of hydrogenatively converting hydrocarbons by reacting said hydrocarbons with hydrogen under hydroconversion conditions of temperature and pressure including a superatmospheric hydrogen partial pressure with a catalytic composition formed on impregnating a foraminous refractory oxide support with an aqueous impregnating medium which forms on admixture of at least one molybdenum compound selected from ammonium heptamolybdate, ammonium phosphomolybdate, molybdic acid, molybdenum trioxide and molybdenum blue, at least one water soluble Group VIII metal compound selected from the nitrates, sulfates, chlorides, hydroxides and carbonates of nickel and cobalt and an acid of phosphorus, in proportions equivalent to about 10 to about 30 weight-percent molybdenum trioxide and about 1 to about 10 weight-percent of the corresponding Group VIII metal oxide at a $P/MoO_3$ weight ratio of about 0.1 to about 0.25 and an initial pH below about 2.5.

2. The method of claim 1 wherein said molybdenum compound is ammonium heptamolybdate and said acid of phosphorus is orthophosphoric acid.

3. The method of claim 1 wherein said catalytic combination comprises an equivalent $MoO_3$ content of about 5 to about 40 weight-percent and about 1 to about 10 weight-percent of the corresponding Group VIII metal oxide.

4. The method of claim 1 wherein said hydrocarbon feed boils primarily above about 100° F. and is reacted with added hydrogen in the presence of said catalytic composition at a temperature of at least about 400° F. and a total pressure of at least about 500 p.s.i.g. for a period of at least about 1 minute sufficient to substantially increase the hydrogen-to-carbon ratio in said hydrocarbons, and the initial pH of said medium is about 1 to about 2.

5. The method of claim 1 wherein said hydrocarbon is hydrogenatively reacted with said hydrogen present in a net added amount of at least about 50 standard cubic feet per barrel of said hydrocarbon under a superatmospheric hydrogen partial pressure and conditions of temperature, pressure and contact time sufficient to react with said hydrocarbon an amount of said hydrogen equivalent to a net hydrogen consumption of at least about 10 standard cubic feet per barrel of said hydrocarbon.

6. The method of claim 1 wherein said hydrocarbon feed boils primarily above about 400° F. and contains at least about 2 parts per million nitrogen as organonitrogen compounds and is contacted with at least about 250 standard cubic feet of net added hydrogen per barrel of said feed at a temperature of at least about 400° F., and a pressure of at least about 500 p.s.i.g., under superatmospheric hydrogen partial pressure in the presence of said catalyst for a period of at least about 1 minute sufficient to substantially increase the hydrogen-to-carbon ratio of said hydrocarbon feed by an amount corresponding to a net hydrogen consumption of at least about 250 standard cubic feet of hydrogen per barrel of said hydrocarbon and substantially reduce the average molecular weight of said hydrocarbon by an amount corresponding to the production of at least 110 moles of hydrocarbon product for each 100 moles of said hydrocarbon feed, and the initial pH of said medium is about 1 to about 2.

7. The method of claim 6 wherein said hydrocarbon feed comprises at least about 10 parts per million nitrogen as organonitrogen compounds and is contacted with said catalyst under said conditions of temperature, pressure, hydrogen partial pressure and contact time sufficient to convert at least 20% of said feed hydrocarbons to products boiling below the initial boiling point of said feed.

8. The method of claim 6 wherein the concentration of said molybdenum compound in said solution is equivalent to about 17 to about 24 weight-percent $MoO_3$, the equivalent concentration of said Group VIII metal oxide is about 2 to about 10 weight-percent, said $P/MoO_3$ ratio is within the range of about 0.12 to about 0.23, and said foraminous support comprises at least one of silica, alumina and physical and chemical combinations thereof.

9. The method of claim 8 wherein said impregnated carrier is aged in contact with said medium for at least about 30 minutes and said catalytic composition is thermally activated in an oxidizing atmosphere at a temperature of about 800 to about 1300° F. prior to contact with said hydrocarbon.

10. The method of reacting hydrogen with hydrocarbons boiling primarily above 100° F. in the presence of a catalytic composition that forms on impregnation of a foraminous refractory oxide suport with the aqueous impregnating medium which forms upon admixture of at least one molybdenum compound selected from ammonium heptamolybdate, ammonium phosphomolybdate, molybdic acid, molybdenum trioxide and molybdenum blue, at least one water soluble Group VIII metal compound selected from the nitrates, sulfates, chlorides, hydroxides and carbonates of nickel and cobalt and orthophosphoric acid in proportions equivalent to about 17 to about 30 weight percent molybdenum trioxide, about 1 to about 10 weight-percent of the corresponding Group VIII metal oxide, and a $P/MoO_3$ weight ratio of about 0.1 to about 0.25 at an initial pH of about 1 to about 2, said reaction being effected under hydroconversion conditions including the temperature of at least about 400° F., a pressure of at least about 500 p.s.i.g., a contact time with said catalyst of at least about 1 minute and a superatmospheric hydrogen partial pressure corresponding to at least about 100 standard cubic feet of added hydrogen per barrel of said hydrocarbon feed sufficient to react said hydrogen with said hydrocarbon feed in an amount corresponding to a net hydrogen consumption of at least about 10 standard cubic feet of hydrogen per barrel of said hydrocarbon feed.

11. The method of claim 10 wherein said molybdenum compound is ammonium heptamolybdate, said salt comprises at least one of the nitrates, sulfates and chlorides of nickel and cobalt, said molybdenum compound is present in said medium in an amount corresponding to about 17 to about 24 weight percent $MoO_3$, and said Group VIII metal compound is present in said medium in an amount corresponding to at least about 1 weight-percent of the corresponding metal oxide.

12. The method of claim 10 wherein said hydrocarbon feed comprises primarily of hydrocarbons boiling above about 400° F. containing at least 10 parts per million nitrogen as organonitrogen compounds and said catalyst comprises an equivalent $MoO_3$ content of about 5 to about 40 weight-percent, about 1 to about 10 weight-percent of the corresponding oxides of said nickel and cobalt, and a $P/MoO_3$ ratio of about 0.12 to about 0.25.

13. The method of claim 10 wherein said hydrocarbon feed boils primarily above 400° F. and contains at least about 10 parts per million nitrogen as organonitrogen compounds and at least about 10 volume percent of compounds having aromatic substituents and said feed is contacted with said catalyst under said hydroconversion conditions sufficient to react an amount of said hydrogen with said hydrocarbons corresponding to a net hydrogen consumption of at least about 50 standard cubic feet of hydrogen per barrel of said feed.

References Cited
UNITED STATES PATENTS

| | | | |
|---|---|---|---|
| 2,547,380 | 4/1951 | Fleck | 208—243 X |
| 2,603,534 | 8/1952 | Fleck | 252—435 |
| 3,232,887 | 2/1966 | Pessimissis | 252—435 |
| 3,287,280 | 11/1966 | Colgan et al. | 252—435 |
| 3,609,099 | 9/1971 | Mickelson | 252—435 |
| 3,617,528 | 11/1971 | Hilfman | 208—216 |
| 3,442,794 | 5/1969 | Van Helden et al. | 208—111 |
| 3,629,146 | 12/1971 | Adams | 252—435 |
| 3,684,695 | 8/1972 | Neel et al. | 208—110 |

DELBERT E. GANTZ, Primary Examiner

G. E. SCHMITKONS, Assistant Examiner

U.S. Cl. X.R.

208—112; 252—437